United States Patent [19]
Donnelly

[11] Patent Number: 4,900,944
[45] Date of Patent: Feb. 13, 1990

[54] BOOSTER UNIT FOR DIESEL ELECTRIC LOCOMOTIVE

[76] Inventor: Frank Donnelly, 1202 Pinewood Crescent, North Vancouver, British Columbia, Canada, V7P 1A6

[21] Appl. No.: 257,645

[22] Filed: Oct. 14, 1988

[51] Int. Cl.$^4$ ............................................. B60L 11/02
[52] U.S. Cl. ...................................... 290/3; 290/4 A; 307/84; 105/35
[58] Field of Search ................... 290/3, 4 R, 4 A, 4 B, 290/9; 307/43, 44, 45, 68, 84, 85, 86; 105/35, 36

[56] References Cited

U.S. PATENT DOCUMENTS

| | | | |
|---|---|---|---|
| 2,265,933 | 12/1961 | Adams | 290/3 X |
| 3,209,704 | 10/1965 | Gratzmuller | 105/35 |
| 3,745,366 | 7/1973 | Simon | 307/68 |
| 4,309,620 | 1/1982 | Bock | 290/4 R |
| 4,593,779 | 6/1986 | Kröhling | 307/84 X |
| 4,634,887 | 1/1987 | Balch et al. | 290/3 |

Primary Examiner—A. D. Pellinen
Assistant Examiner—W. E. Duncanson, Jr.
Attorney, Agent, or Firm—Fetherstonhaugh & Co.

[57] ABSTRACT

A booster unit for diesel electric locomotive having a frame-mounted diesel engine, a main traction generator and a series of traction motors connected to said generators is disclosed. It is comprised of a gas turbine mounted on the frame adjacent to the diesel engine, a high speed alternator connected directly with the turbine and a series of rectifiers connected at the output of the high speed alternator. The alternator and rectifiers form a high speed electric generator. A load control means connected at the output of the alternator is provided for controlling the output power thereof. The high speed generator is connected in parallel with the main traction generator such that the traction motors can be supplied with extra electrical power when required.

5 Claims, 1 Drawing Sheet

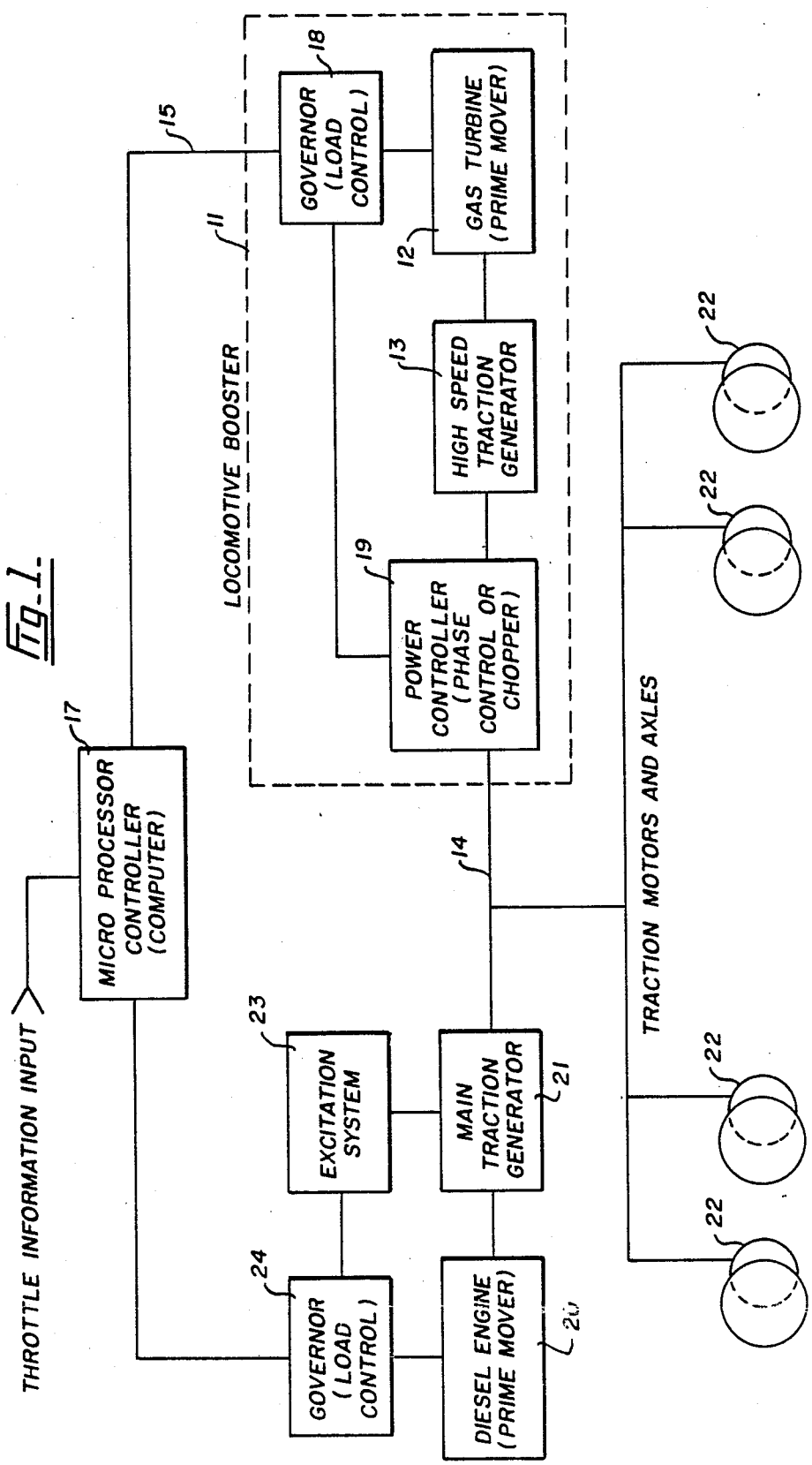

BOOSTER UNIT FOR DIESEL ELECTRIC LOCOMOTIVE

FIELD OF THE INVENTION

This invention relates to diesel electric locomotives and more particularly to a booster unit for boosting the locomotive power output.

DESCRIPTION OF THE PRIOR ART

The diesel electric locomotive has long been regarded as a relatively powerful and energy efficient source of motive power for many rail transport applications. However, it has been recognized that more powerful internally powered locomotive than is currently available namely, the diesel power locomotive would be an asset to many railways. This is because the more power the locomotive embodies, the more productive it is providing that this power can be successfully transferred to the driving wheels of the locomotive and the rail it rides on.

It has been found that a more powerful locomotive can be provided by "adding to" or "boosting" the power of the widely used diesel electric locomotive with an onboard electric power-producing booster unit. The booster unit is an engine and an electric generator that would assist the effort when needed of the locomotive diesel engine and traction generator by parallelling the electrical output from both generators for supplying the extra electrical power to the traction motors.

Because of the minimal space available on the diesel electric locomotive itself, the required booster unit (engine and generator) must be compact and must have a high power density (relatively high power output for its volume).

It has been found that the high power density gas turbine is very well suited to the limited space requirement required by a booster unit. Also, it has been found that a high speed alternator is equally well suited in physical size for its relative power conversion capacity since the high speed alternator is able to run directly from the gas turbine without a gearbox which is space consuming and energy robbing.

In addition to the power density aspect of the gas turbine and complimentary high speed alternator, a number of attributes have been found to make this power producing equipment attractive in rail transport for the application being considered. First it is the ability of gas turbines to run intermittently, second is the long service life with a relatively minimal maintenance requirements and thirdly the gas turbine simplicity.

It has been found that even with the relative inferior thermal efficiency of the gas turbine as compared with the diesel engine the Locomotive Booster Unit (gas turbine and high speed alternator) can improve the operating economy for railways with a certain operational characteristic. This characteristic is the need to meet peak motive power demands for relatively short periods of time. Typical of a railway with this characteristic is one with steep grades and heavy tonnage moving in one direction. This can describe railways operating in mountainous terrain hauling resource products Under these conditions the diesel motive power operating economy can be improved with the implementation of the locomotive booster unit by providing additional power on a limited duty cycle. If the locomotive's traction motor can accept the additional power and if there is adequate wheel and rail adhesion the Locomotive Booster Unit effectively replaces the additional diesel electric locomotives that are in the consist for meeting the peak motive power demands. With this concept of operations, the Locomotive Booster Unit is used only when it is needed to raise the peak power output of the diesel electric locomotive to meet peak motive power demand. The Locomotive Booster would not be used for operating segments where power provided by the diesel engine is sufficient, thereby retaining the superior economy of straight diesel locomotive operation.

Accordingly a booster unit would increase the horsepower provided per locomotive unit and a corresponding reduction in the number of units needed to handle a train or to operate a railroad. With this reduction in the number of units there are substantial capital and operating cost savings.

The limited high fuel consumption for the energy that is produced while power boosting is fully offset by reduced capital, maintenance and possible energy cost providing the described conditions create peak motive power demand of short duration and the locomotive booster operates on a sufficiently limited duty cycle. There is the possibility with locomotive power boosting to substantially or fully offset the additional fuel that is used during the boost period by not taxing the train movements total energy requirement with the extra energy that is needed to haul additional diesel electric locomotive that are needed for a limited period of time.

SUMMARY OF THE INVENTION

Accordingly, the present invention provides a booster unit for diesel electric locomotives having a frame mounted diesel engine, a main traction generator and a series of traction motors connected to said generator, comprising: a gas turbine mounted on said frame adjacent to said diesel engine; a high speed alternator connected directly with said turbine; a series of rectifiers at the output of said high speed alternator, said alternator and rectifiers forming a high speed traction generator; load control means connected at the output of said alternator for controlling the output power thereof, wherein said high speed electric generator is connected in parallel with said main traction generator such that said traction motors can be supplied with extra electrical power when required.

DESCRIPTION OF THE DRAWINGS

Particular embodiments of the invention will be understood in conjunction with the accompanying drawings in which:

FIG. 1 is a schematic of the locomotive booster unit as used according to the present invention.

DESCRIPTION OF THE PREFERRED EMBODIMENTS

The schematic of FIG. 1 shows the interconnection of the diesel electric locomotive booster 11 which is basically used as a second power source and is mounted on the frame and under the hood of the conventional diesel electric locomotive. The locomotive booster 11 is comprised of a gas turbine 12 which is used as the prime mover. The gas turbine is directly connected to a high speed traction generator 13 which is basically comprised of a high speed alternator connected to a series of rectifiers. The booster's output 14 and control line 15 is integrated into the electrical system which is run by microprocessor controller 17. The gas turbine 12 is fueled from the locomotive's fuel tanks with diesel fuel.

The governor or load controller 18 is used in conjunction with a power controller 19 to regulate the loading of the generator 13 (and therefore, the resistance it offers to the turning of gas turbine 12) just matches the horsepower the turbine can develop, and permit the system to remain stable at the governed speed.

The basic electric diesel locomotive is provided with a diesel engine 20 used as a prime mover, connected to a main traction generator 21 which is further connected to a series of traction motors 22 supported on each axle. Similarly, a governor or load controller 24 is being used along with excitation system 23 to regulate the field of generator 21 so that the electrical power produced by the generator matches the horsepower the diesel can develop permitting the system to stay stable at the governed speed.

Gas turbine 12 has to meet a certain number of physical requirements such as a small physical size, required power output, ruggedness, simplicity, availability and cost. Such a gas turbine is currently commercially available as a Kawasaki Gas Turbine Model M1A-01 which can develop 1600 horsepower and able to rotate the high speed alternator at 22,000 revolutions per minute.

The high speed alternator used for generator 13, is a permanent magnet synchronous alternator providing superior power density, efficiency and overall ruggedness.

An auxiliary gearbox (not shown) is mounted on the end bell of the alternator. The gearbox allow accessories, such as the fuel pump and the governor for the gas turbine, to be mounted. The output voltage of the alternator will be constant at approximately 1,300 volts when rectified. The governor load controller 18 can either regulate by phase control with thyristors or by use of a chopper circuit operating at 1,300 volts.

The system could be mounted on a 6 axle locomotive capable of utilizing 6,000 horsepower at the input to the electric transmission. Newer traction motors like to EMD's D87 are capable of developing 875 horsepower per motor and would be suitable for this type of locomotive and power output. Such a locomotive is made available by General Motors of Canada, Diesel Division under Model SD60 which is rated at 3,800 horsepower and with power boosted would be rated at 5,400 horsepower at the alternator inputs. Other similar locomotive units could also be adapted to use a booster unit. The type of locomotive will, of course, be dependent upon the operation and terrain the locomotive is used for because minimum speeds effect traction capacities and wheels and rail adhesion.

I claim:

1. A booster unit for diesel electric locomotive having a frame mounted diesel engine, a main traction generator and a series of traction motors connected to said generators, comprising:
    a gas turbine mounted on said frame adjacent said diesel engine;
    a high speed alternator connected directly with said turbine;
    a series of rectifiers connected at the output of said high speed alternator, said alternator and rectifiers forming a high speed electric generator;
    load control means connected at the output of said alternator for controlling the output power thereof, said high speed generator being connected when needed in parallel with said main traction generator such that said traction motors can be supplied with extra electrical power when required.

2. A booster unit as defined in claim 1 wherein said control means comprises a phase control circuit having thyristors and filtering.

3. A booster unit as defined in claim 1 wherein said control means is regulated by means of a chopper circuit operating from the rectified high speed alternator output.

4. A booster unit as defined in claim 1 wherein said high speed alternator is a permanent magnet synchronous alternator.

5. A booster unit as defined in claim 1 further comprising an auxiliary gearbox mounted on the end of said alternator or driving peripheral equipment.

* * * * *